Aug. 24, 1965    H. A. MOODY    3,202,431
UNIVERSAL EXPANDING CHUCK
Filed Oct. 26, 1962
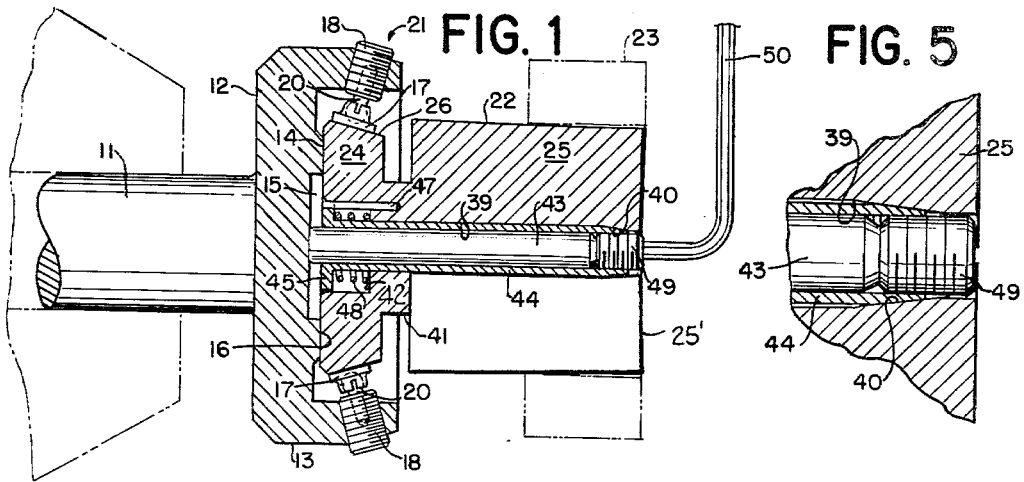
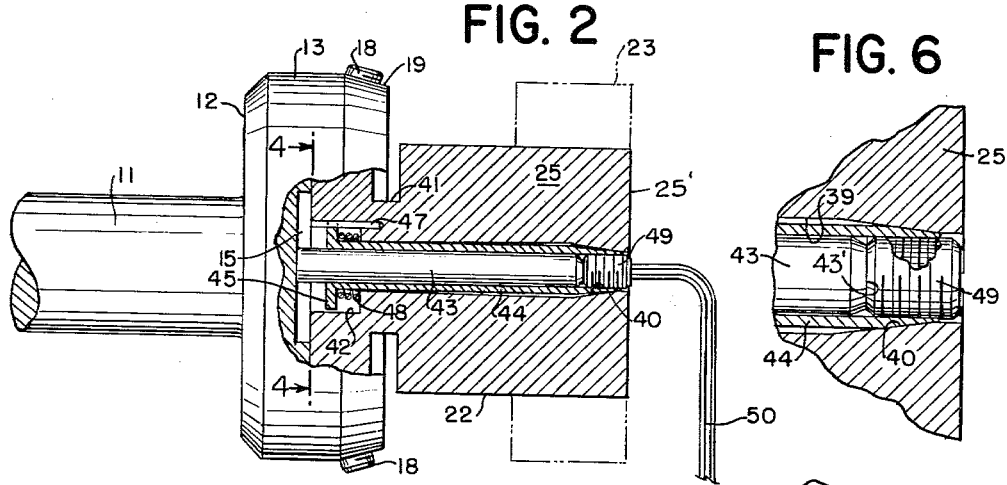
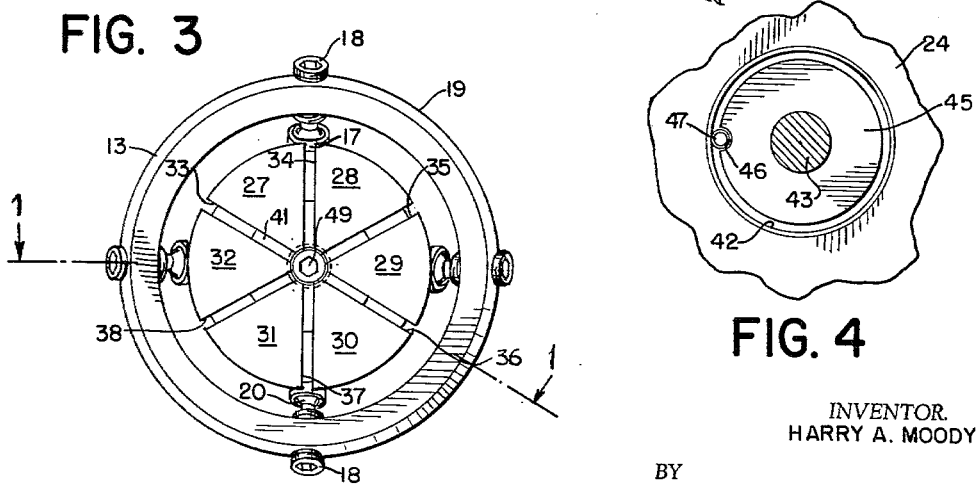
INVENTOR.
HARRY A. MOODY
BY
Mandeville & Schweitzer
ATTORNEYS

United States Patent Office 3,202,431
Patented Aug. 24, 1965

3,202,431
UNIVERSAL EXPANDING CHUCK
Harry A. Moody, New Fairfield, Conn., assignor to The Dunham Tool Company, Inc., New Fairfield, Conn., a corporation of Connecticut
Filed Oct. 26, 1962, Ser. No. 233,346
7 Claims. (Cl. 279—2)

The present invention relates to work holding devices for turning machines, and more particularly to a new and improved universal expandable collet for internally chucking a workpiece.

An important aspect of the invention is the provision of a universal collet which may be mounted at its inner end to a turning machine and which may be actuated for internal chucking at its outer end. An additional aspect is the provision of a collet expander rod having a "push-out" type of action but being accessible and actuable from the face of a turning machine through a "draw-in" type of actuation. A further aspect is the provision of a universal collet, which is efficient in operation and economical in manufacture. A corollary aspect of the invention is the provision of a reliable means for rapidly mounting and accurately aligning a collet chuck concentrically with a machine spindle.

The aforementioned aspects, in addition to others which will become apparent from the disclosure, are realized in a preferred embodiment of the invention, which includes, generally, an expandable collet, an expander rod, and adapter means for mounting the collet and expander rod concentrically with a machine spindle.

In accordance with the present invention, an expandable collet is provided with a "universal" end having surfaces adapted to mate with and to be clamped by a spindle nose adapter. The universal end defines a cylindrical cavity therein which is advantageously in the nature of a piston cylinder. The collet also includes an expandable "chucking" end which is conventionally slotted. A bore advantageously extends from the outer chucking end of the collet to the cylindrical cavity at the inner end. The bore is uniform in diameter for a substantial portion of its length; however, it is tapered slightly through a gradual reduction in its diameter toward the outer chucking end of the collet.

In the present invention, a series of swivel pads is disposed about the periphery of a spindle nose in a predetermined manner to form an adapter for locking the expandable collet to a turning machine in an extremely high degree of concentric and axial alignment.

In operation, the collet is expanded at its chucking end by an expander rod, advantageously in the form of a hollow expander rod, having an integral enlarged head movable in and non-rotatably keyed to the cylindrical cavity in the universal end of the collet. The hollow expander rod is internally threaded at its free end to engage an actuating screw.

Progression of the actuating screw into the expander rod toward the spindle is precluded by a reference bar extending through the piston and acting at one end against the spindle nose adapter and at the other end against the base of the screw. Thus, rotation of the screw will not advance the screw relative to the adapter into the hollow expander rod but will tend to drive the head into the cylinder through movement of the hollow exanpder rod, itself, over the screw and into the tapered portion of the bore. The action of the rod against the taper forces the collet segments apart and thereby expands the collet for conventional internal chucking applications.

To understand more completely the nature of the invention, and further specific objectives thereof, reference should be had to the following detailed description taken in conjunction with the drawing, in which:

FIG. 1 is a cross sectional view of an internal chucking mechanism, embodying the principles of the invention, showing the collet in an unexpanded condition;

FIG. 2 is a cross sectional view of the mechanism of FIG. 1, showing the collet in an expanded condition;

FIG. 3 is an end view of the mechanism of FIG. 1;

FIG. 4 is an enlarged cross-sectional view of the mechanism of FIG. 2 taken along line 4—4 thereof; and FIGS. 5 and 6 are enlarged details of the expander and actuating screw of the mechanism of FIGS. 1 and 2 respectively.

With reference to FIG. 1, a spindle 11 adapted to be connected to and rotated by a turning machine, has fixed thereto a spindle nose 12, which advantageously has an axially projecting peripheral bell flange 13 and an axially projecting boss 14 concentric therewith. A recess 15 is defined by the boss 14, which itself, as clearly shown in FIG. 1, defines a seating surface 16 which is disposed inwardly of the bell flange 13. At its free edge, the bell flange 13 has a beveled rim portion 19 which receives four equally spaced swivel pads 17, each of which is joined to a clamping set screw 18 by a ball and socket joint 20. The screws 18 are conventionally inclined at an angle with the bell flange 13 so that clamping forces imparted thereby will be directed towards the seating surface 16. The spindle nose 12 and the swivel pads 17 comprise an improved bell chuck adapter indicated generally at 21.

In accordance with the invention, an expandable collet 22 for internally chucking a workpiece 23 (shown in profile) is provided with an inner universal end 24 and an outer chucking end 25. The universal end 24 has an inwardly inclined surface 26 which is adapted to be engaged by the swivel pads 17 to clamp the inner end 24 of the collet against the seating surface 16 of the spindle nose 12. The chucking end is comprised of a series of jaws 27–32, clearly illustrated in FIG. 3, which may be expanded to chuck the workpiece 23 as shown in FIG. 2.

The jaws 27–32 are formed by a series of slots 33–38 which extend inwardly from the cylindrical surface of the chucking end to a longitudinal axial bore 39. The integrity of the collet is maintained by a neck 41 which joins the universal end 24 with each of the jaws of the chucking end 25. The bore 39 is slightly tapered toward its outer end, as shown in detail at 40 in FIGS. 5 and 6, and extends from the free edge 25' of the chucking end 25 through the neck 41 to a cylindrical cavity 42 defined by the universal end 24.

A cylindrical reference element or bar 43 extends from the spindle nose recess 15 through the untapered portion of the bore 39. A hollow expander rod 44 with a head 45 integral therewith is mounted telescopically about the reference bar 43 so that the head 45 may be axially moved in the cylindrical cavity 42 and the hollow expander rod displaced in the bore. The head 45 includes a semi-circular notch 46 which registers with a cylindrical key 47, advantageously in the form of a pin mounted adjacent the cavity wall as shown in FIG. 4, to prevent the rotation of the hollow expander rod 44. The expander 44 is urged rearwardly away from the chucking end 25 of the collet by a coil spring 48 acting between the base of the cavity 42 and the piston 45. The expander rod 44 is advantageously threaded internally at its outer end to engage an actuating set screw 49 which acts against the reference surface 43' of the bar 43.

Operation of the mechanism of the invention to chuck internally the workpiece 23 is accomplished in the following manner. The collet 22 is aligned with and held to the spindle nose adapter 21 by the swivel pads 17 which firmly clamp the universal end 24 against the seat 16. Fine adjustment of the concentricity of the collet 22 with the spindle 11 may be had through the individual adjustment of each of the screws 18. Use of the swivel pads 17 tends to eliminate the eccentricity that would otherwise be induced by conventional screw means when unequally turned down.

The chucking end 25 is adapted to grip internally the workpiece 23 through the expansion of its jaws 27–32. This is readily accomplished at the face of the turning machine by rotating the actuating screw 49 with a wrench 50. Rotation of the actuating screw 49 will drive the threaded expander rod 44 over the screw and into the tapered bore 40 causing the jaws 27–32 to be expanded to contact grippingly the workpiece 23. Release of the workpiece is effected by the contraction of the jaws 27–32 through the reversing of the rotation of the screw 49 to back the expander rod 44 out of the taper 40.

The notch 46 and key 47 prohibit rotation of the head 45, while the spring 48 advantageously applies a constant force against the head sufficient in magnitude to overcome the frictional engagement of the expander thread with the actutuating screw threads. Threfore the collet jaws will be expanded by the movement of the expander rod into the taper caused by the positive driving action of the screw 49. During the reversal of the rotation of the actuating screw, the spring will assure the withdrawal of the expander from the taper. Although the actuating screw, itself, is bi-directionally rotatable, it remains in a fixed relation with the adapter and collet, while the expander rod moves axially relative thereto.

Once the expander rod 44 has been seated in the collet by the alignment of the notch 46 and the key 47, the expander rod 44 will not change its position radially with respect to the collet; that is to say, the expander rod is non-rotatable with respect to the collet and is free only to move axially into and out of the taper. In other words, the tapered end surfaces of the expander rod 44 will always mate in an identical fashion with the same internal surfaces of the taper 40. This ensures the holding of extremely accurate concentricity, especially important in meeting the requirements of consistent repeat accuracy.

Thus it will be understood that the collet 22 is expanded by a "push-out" type of action of the expander rod 44 moving out against the taper 40, although actuation of the rod is, in fact, from the front of the turning machine. A "draw-in" type of movement of the rod 44 over the actuating screw 49 is realized as the rod is driven toward the wrench 50, at the face of the machine.

As will be understood, the same spindle nose adapter 21 and the same hollow expander rod 44 can advantageously and economically be used with a series of collets with chucking ends of varying outside diameters but having universal ends of common shape and dimensions.

The expanding collet of the present invention provides a quickly mountable and efficient work holding device for use in internal chucking applications. It provides a new and improved expander rod which is uniquely actuated in a "draw-in" fashion from the face of the turning machine to spread the collet jaws with a "push-out" action.

Although the present invention has been described with reference to a specific, preferred embodiment, it should be understood that the disclosure has been made only by way of example and that certain changes in details of construction and in the combination and arrangement of the parts may be made without departing from the spirit and the scope of the invention as hereinafter claimed.

I claim:
1. A device for internally chucking a workpiece comprising:
   (a) a collet having inner and outer end portions,
   (b) said inner end portion defining a cavity therein,
   (c) said outer end portion defining an axial bore extending from the free edge thereof to said cavity,
   (d) said bore being convergently tapered at the free edge of said outer end portion,
   (e) said outer portion defining a plurality of radial slots extending from said bore to the surface of said outer portion to form a plurality of jaws,
   (f) a hollow expander rod with a head integral therewith,
   (g) said expander rod being adapted to be axially displaced in said bore and said head being adapted to be axially displaced in said cavity,
   (h) said expander rod having internal threads at its free end,
   (i) actuating screw means cooperating with said internal threads,
   (j) said screw means being maintained in a predetermined relation with a reference surface,
   (k) whereby rotation of said screw means in a predetermined direction tends to drive the free end of said expander rod over said screw means and into said tapered portion of said bore to expand said jaws.
2. A work-holding device according to claim 1 in which
   (a) said cavity is cylindrical in shape,
   (b) said head is substantially cylindrical in shape and defines a notch therein, and
   (c) a key is included in said cavity to register with said notch and prevent rotation of said head.
3. A work-holding device according to claim 2 in which
   (a) a spring means acts in said cavity and against said head to urge said head away from said tapered portion of said bore.
4. An expandable collet having inner and outer ends,
   (a) said inner end defining a cavity adapted to receive an inner end portion of an expander rod,
   (b) said collet defining a convergent tapered bore extending from said cavity to the free edge of said outer end and adapted to receive an expander rod,
   (c) a key located in said cavity and adapted to register with an inner end portion of an expander rod actuable from the outer end of said collet,
   (d) said outer portion defining a plurality of radial slots extending from said bore to the surface of said outer portion to form a plurality of jaws, and
   (e) said jaws being expandable through the divergence of said convergent bore by the movement therein of an expander rod toward said inner end portion.
5. An expander for an internal collet chuck body having a plurality of resilient jaws defining an internally tapered bore comprising:
   (a) a hollow expander rod having a head integral therewith,
   (b) said expander rod having an internally threaded free end the external portions of which are adapted to engage the tapered bore defined by the jaws of said chuck,
   (c) a reference element maintained in a predetermined relation to said expander rod, and
   (d) actuating screw means cooperating with said reference element and engaging said free end for selectively axially displacing said expander rod with respect to said reference element.
6. A universal expandable chucking device comprising:
   (a) a collet having continuous integral inner end portions and outer end portions,
   (b) said collet defining a stepped bore extending therethrough,
   (c) said bore being convergently tapered at the free end of said outer end portion,
   (d) said bore having an increased diameter at the free end of said inner end portion and there defining a cylindrical cavity,
   (e) said outer portion defining a plurality of radial slots extending from said bore to the surface of said outer portion to form a plurality of jaws,

(f) a hollow expander rod having a head portion extending into said stepped bore,
(g) said rod being internally threaded at its free end,
(h) a reference bar extending through said rod and head portion and adapted to abut a fixed surface,
(i) an actuating screw being threadingly engaged with said expander rod and acting against said reference bar,
(j) spring means urging said head portion away from said outer end portion,
(k) whereby selective rotation of said actuating screw drives said hollow expander rod into and out of said tapered portion of said bore,
(l) thereby causing the collet jaws to expand and allowing the collet jaws to contract.

7. A device for internally chucking a workpiece or the like comprising:
(a) a collet having inner and outer end portions,
(b) said collet defining a bore extending therethrough,
(c) said bore being tapered at the free end of said outer portion,
(d) said outer portion defining a plurality of radial slots communicating with said bore to form expandable jaws,
(e) thread means located in said bore,
(f) an expander surface movable into the tapered portion of said bore and cooperable therewith to expand said jaws,
(g) actuating screw means engaging said thread means in the outer end portion of said collet,
(h) said actuating screw means cooperating with said thread means and said expander surface,
(i) whereby relative movement of said screw means and said thread means will move said expander surface into the tapered portion of said bore to expand said jaws.

References Cited by the Examiner
UNITED STATES PATENTS

| | | | |
|---|---|---|---|
| 1,648,032 | 11/27 | Starkin | 279—2 X |
| 2,367,703 | 1/45 | Vaughan | 279—2 |
| 2,639,157 | 5/53 | Buck | 279—6 |
| 2,785,902 | 3/57 | Zajdel | 279—6 |
| 2,929,635 | 3/60 | Czerenda | 279—2 |
| 2,970,843 | 2/61 | Bourguignon | 279—2 |

ROBERT C. RIORDAN, *Primary Examiner.*
FRANK SUSKO, *Examiner.*